(12) United States Patent
Czajkowski et al.

(10) Patent No.: US 7,237,148 B2
(45) Date of Patent: *Jun. 26, 2007

(54) FUNCTIONAL INTERRUPT MITIGATION FOR FAULT TOLERANT COMPUTER

(76) Inventors: David Czajkowski, 10401 Roselle St., Suite 400, San Diego, CA (US) 92121; Darrell Sellers, 10401 Roselle St., Suite 400, San Diego, CA (US) 92121

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 413 days.

(21) Appl. No.: 10/656,720

(22) Filed: Sep. 8, 2003

(65) Prior Publication Data

US 2005/0055607 A1  Mar. 10, 2005

Related U.S. Application Data

(60) Provisional application No. 60/408,205, filed on Sep. 5, 2002.

(51) Int. Cl.
*G06F 11/00* (2006.01)

(52) U.S. Cl. .................... 714/21; 714/17; 714/55; 714/820

(58) Field of Classification Search ............ 714/16, 714/17, 21, 822
See application file for complete search history.

(56) References Cited

U.S. PATENT DOCUMENTS 4,132,975 A * 1/1979 Koike .................... 714/797

(Continued)

FOREIGN PATENT DOCUMENTS

GB   2 903 614   * 9/1982

OTHER PUBLICATIONS

Makherjee et al.; "Detailed Design and Evaluation of Redundant Multithreading Alternatives"; International conference on Computer Architecture, Proceedings of the 29th Annual International Symposium on Computer Architecture, published 2002; pp. 99-110.*

(Continued)

*Primary Examiner*—Scott Baderman
*Assistant Examiner*—Joshua Lohn
(74) *Attorney, Agent, or Firm*—The Nath Law Group; Jerald L. Meyer; Robert P. Cogan

(57) ABSTRACT

A new method for the detection and correction of environmentally induced functional interrupts (or "hangs") induced in computers or microprocessors caused by external sources of single event upsets (SEU) which propagate into the internal control functions, or circuits, of the microprocessor. This method is named Hardened Core (or H-Core) and is based upon the addition of an environmentally hardened circuit added into the computer system and connected to the microprocessor to provide monitoring and interrupt or reset to the microprocessor when a functional interrupt occurs. The Hardened Core method can be combined with another method for the detection and correction of single bit errors or faults induced in a computer or microprocessor caused by external sources SEUs. This method is named Time-Triple Modular Redundancy (TTMR) and is based upon the idea that very long instruction word (VLIW) style microprocessors provide externally controllable parallel computing elements which can be used to combine time redundant and spatially redundant fault error detection and correction techniques. This method is completed in a single microprocessor, which substitute for the traditional multi-processor redundancy techniques, such as Triple Modular Redundancy (TMR).

11 Claims, 9 Drawing Sheets

U.S. PATENT DOCUMENTS

| | | | |
|---|---|---|---|
| 4,199,810 A * | 4/1980 | Gunckel et al. | 714/15 |
| 4,670,880 A * | 6/1987 | Jitsukawa et al. | 714/797 |
| 4,817,094 A * | 3/1989 | Lebizay et al. | 714/797 |
| 4,943,969 A * | 7/1990 | Criswell | 714/820 |
| 4,956,807 A * | 9/1990 | Hosaka et al. | 714/55 |
| 4,959,836 A * | 9/1990 | Berard et al. | 714/822 |
| 5,233,613 A * | 8/1993 | Allen et al. | 714/55 |
| 5,235,220 A * | 8/1993 | Takizawa | 326/35 |
| 5,345,583 A * | 9/1994 | Davis | 714/23 |
| 5,414,722 A * | 5/1995 | Tollum | 714/822 |
| 5,594,865 A * | 1/1997 | Saitoh | 714/55 |
| 5,604,755 A * | 2/1997 | Bertin et al. | 714/799 |
| 5,706,423 A * | 1/1998 | Sugimoto | 714/49 |
| 5,822,515 A * | 10/1998 | Baylocq | 714/56 |
| 6,754,846 B2 * | 6/2004 | Rasmussen et al. | 714/11 |
| 2004/0153747 A1 * | 8/2004 | Czajkowski | 714/10 |
| 2004/0250178 A1 * | 12/2004 | Munguia et al. | 714/55 |
| 2005/0055607 A1 * | 3/2005 | Czajkowski et al. | 714/25 |
| 2005/0138485 A1 * | 6/2005 | Osecky et al. | 714/48 |
| 2005/0172196 A1 * | 8/2005 | Osecky et al. | 714/746 |

OTHER PUBLICATIONS

Reinhardt et al.; "Transient Fault Detection Via Simultaneous Multithreading"; International conference on Computer Architecture, Proceedings of the 27th Annual International Symposium on computer Architecture; published 2000, pp. 25-36.*

* cited by examiner

FUNCTIONAL INTERRUPT MITIGATION FOR FAULT TOLERANT COMPUTER

CROSS REFERENCE TO RELATED APPLICATIONS

This application claims priority to U.S. Provisional Patent No. 60/408,205, filed on Sep. 5, 2002, entitled "Functional Interrupt Mitigation for Fault Tolerant Computer," naming David Czajkowski as first named inventor and Darrell Sellers as second named inventor, of which is hereby incorporated by reference in its entirety.

BACKGROUND OF THE INVENTION

During use, microprocessors may be exposed to external conditions which may cause internal data bits within or being processed by the microprocessor to change. Commonly, these events are classified as single event upsets (SEU). Conditions giving rise to SEU may include ambient radiation (including protons, x-rays, neutrons, cosmic rays, electrons, alpha particles, etc.), electrical noise (including voltage spikes, electromagnetic interference, wireless high frequency signals, etc.), and/or improper sequencing of electronic signals or other similar events. The effects of SEU conditions can include the processing of incorrect data or the microprocessor may temporarily or permanent hang, which may be reference to as single event functional interrupt (SEFI), for a temporary or permanent condition.

A number of solutions to avoid or correct for these events have been developed, and include modifying the manufacturing process for the microprocessor. For example, microprocessor may utilize temporal redundancy or spatial redundancy in an effort to mitigate the likelihood of SEUs. While these systems have proven somewhat effective in reducing or avoiding SEU and SEFI events, several shortcomings have been identified. For example, using spatial redundancy in a triple modular redundant design allows three microprocessors to operate in parallel to detect and correct for single event upsets and functional interrupts, but require two additional microprocessors and support circuits (e.g. memory) causing additional power and synchronization problems. Another solution is to manufacture the microprocessor integrated circuits (IC) on radiation tolerant processes, which historically lag commercial devices by two to three generations. More specifically, today's radiation-tolerant IC production processes produce devices utilizing 0.35 micrometer geometries while non-radiation tolerant devices typically utilize 0.13 micro-meter geometry. The effect of the larger geometry is much slower performance and higher power consumption for the microprocessor.

In light of the foregoing, there is an ongoing need for high performance, low power consumption radiation tolerant systems and devices, that mitigate the problem of single event functional interrupt (SEFI), also known as environmental induced hangs.

BRIEF SUMMARY OF THE INVENTION

The present application discloses fault tolerant circuits and companion software routines for use in computer systems and method of use. In one embodiment, a computer system with improved fault tolerance from microprocessor hangs is disclosed and includes a microprocessor, a fault tolerant software maintenance routine configured to send a periodic output signal from the microprocessor to a separate circuit (termed a "Hardened Core" or "H-Core") in communication with the microprocessor, the Hardened Core circuit configured to monitor the periodic signal, the control lines (reset, non-maskable interrupt, interrupts, etc.) of the microprocessor wired through the Hardened Core circuit in a manner that allows the Hardened Core to selectively and sequentially activate each control line when periodic signal from microprocessor is not received on periodic schedule, and a set of software repair routines comprised of known instructions which provide a stop to all existing microprocessor instructions and force a controlled restart, where repair routines are operational at the control line interrupt vector memory addresses of the microprocessor.

In another embodiment, a computer system with improved fault tolerance from microprocessor hangs is disclosed and includes a microprocessor, a fault tolerant software maintenance routine configured to send a periodic output signal from the microprocessor to a separate circuit (termed "Hardened Core with Power Cycle") in communication with the microprocessor, the Hardened Core with Power Cycle configured to monitor the periodic signal, the control lines (reset, non-maskable interrupt, interrupts, etc.) of the microprocessor wired through the Hardened Core with Power Cycle circuit in a manner that allows the Hardened Core with Power Cycle circuit to selectively and sequentially activate each control line when periodic signal from microprocessor is not received on a periodic schedule, the power supply lines of the microprocessor wired through the Hardened Core with Power Cycle circuit in a manner that allows the Hardened Core with Power Cycle circuit to selectively turn off and then on the power supply lines when the periodic signal from the microprocessor is not received on a periodic schedule, and a set of software repair routines comprised of known instructions which provide a stop to all existing microprocessor instructions and force a controlled restart, where repair routines are operational at the control line interrupt vector memory addresses of the microprocessor.

In another embodiment, a software and hardware computer system with improved fault tolerance from microprocessor data errors and microprocessor hangs is disclosed and includes a very long instruction word microprocessor, a fault tolerant software routine comprising a first instruction and a second instruction, each inserted into two spatially separate functional computational units in the VLIW microprocessor at two different clock cycles and stored in a memory device in communication with the microprocessor, the first and second instructions being identical, a software instruction to compare the first and second instruction in the memory device in communication with a VLIW microprocessor compare or branch units, and configured to perform an action if the first and second instruction match, the fault tolerant software routine comprising a third inserted into a third spatially separate functional computational units in the VLIW microprocessor at a third different clock cycles and stored in a third memory device in communication with the microprocessor, the first, second, and third instructions being identical, and the software instruction to compare the first, second, and third instructions in the memory devices in communication with a VLIW microprocessor compare or branch units, and configured to perform an action if any of the first, second and third instructions match; plus a fault tolerant software maintenance routine configured to send a periodic output signal from the VLIW microprocessor to a separate circuit (termed "Hardened Core") in communication with the VLIW microprocessor, the Hardened Core circuit configured to monitor the periodic signal, the control lines (reset, non-maskable interrupt, interrupts, etc.) of the microprocessor wired through the Hardened Core circuit in a manner that allows the Hardened Core to selectively and sequentially activate each control signal when periodic signal from microprocessor is not received on periodic schedule, and a set of software repair routines comprised of known instructions which provide a stop to all VLIW microprocessor instructions and force a controlled restart, where repair routines are operational at the control line interrupt vector memory addresses of the VLIW microprocessor.

DETAILED DESCRIPTION OF THE INVENTION

The Hardened Core system disclosed herein is a fault detection and correction system capable of being implemented with any microprocessor. In one embodiment, the microprocessor control signals, typically reset(s) and interrupt(s), are electrically connected through the Hardened Core circuit, wherein the signals are activated when the Hardened Core circuit does not receive a periodic timer signal from the microprocessor, which is generated by software routine(s) in the microprocessor software.

Figure 1:
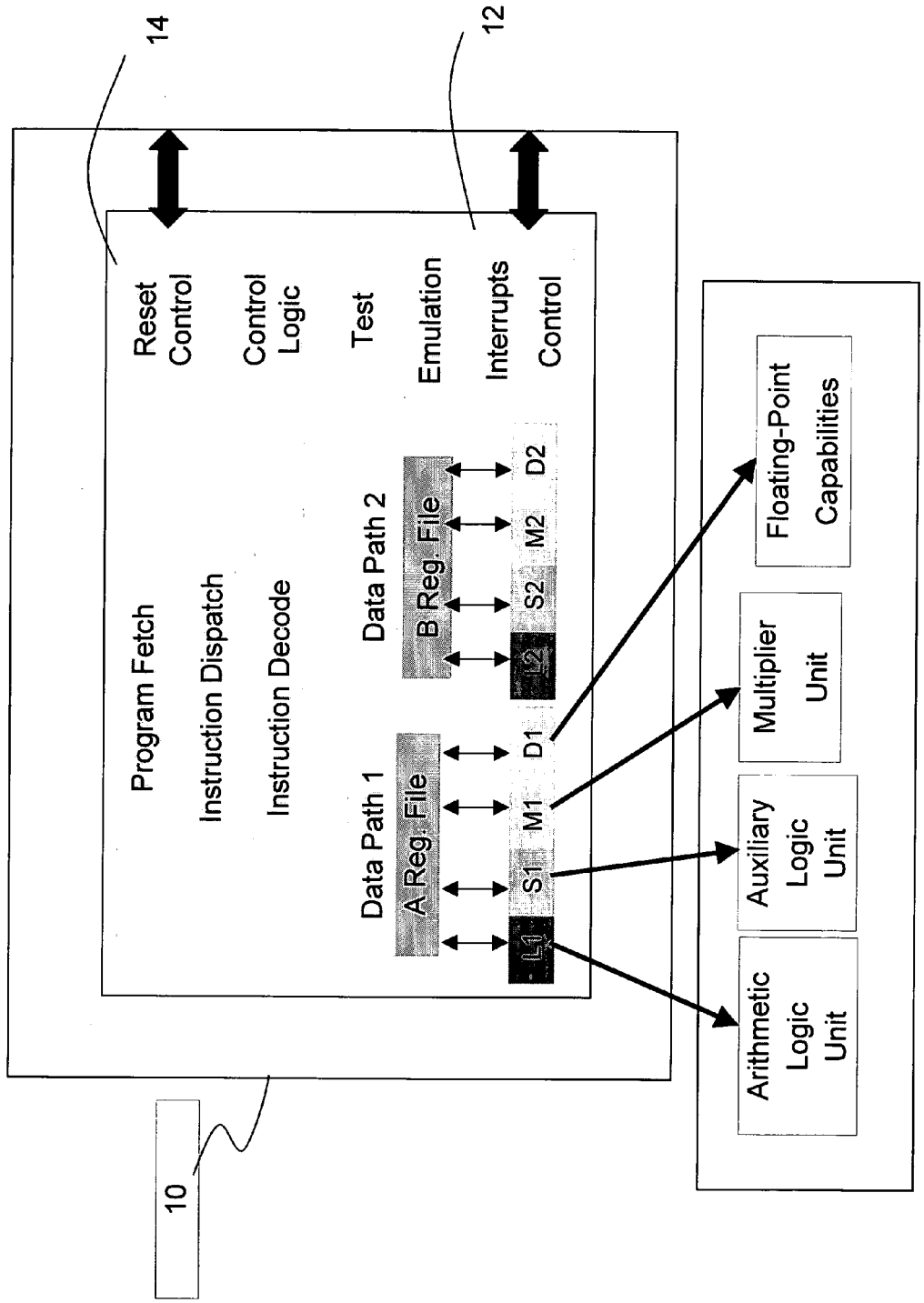
FIG. 1 shows an operational schematic of a typical microprocessor.

FIG. 1 shows a typical microprocessor. As shown the microprocessor 10 typically includes a group of external input interrupt control signals 12 and reset control signals 14. When activated, the interrupt control signal(s) 12 typically cause the microprocessor to jump from its current software execution to predetermined software routine(s) stored at a specific location (vector address), where the priority and actions of the interrupt are based on the specific design of the individual interrupt control function. Additionally when activated, the reset control signal(s) 14 typically cause the microprocessor to clear all, or a predetermined subset area of the microprocessor, hardware functions and restart the microprocessor to execute software at its predetermined startup address. Hardware circuits may operate and activate the interrupt control 12 and reset control 14 signals externally by providing an activation signal with the proper voltage and timing. Exemplary microprocessors include, for example, the Pentium III manufactured by Intel Corporation, although those skilled in the art will appreciate that the Hardened Core system disclosed herein is configured to operate with a variety of different microprocessors having varying architectures.

Figure 2:
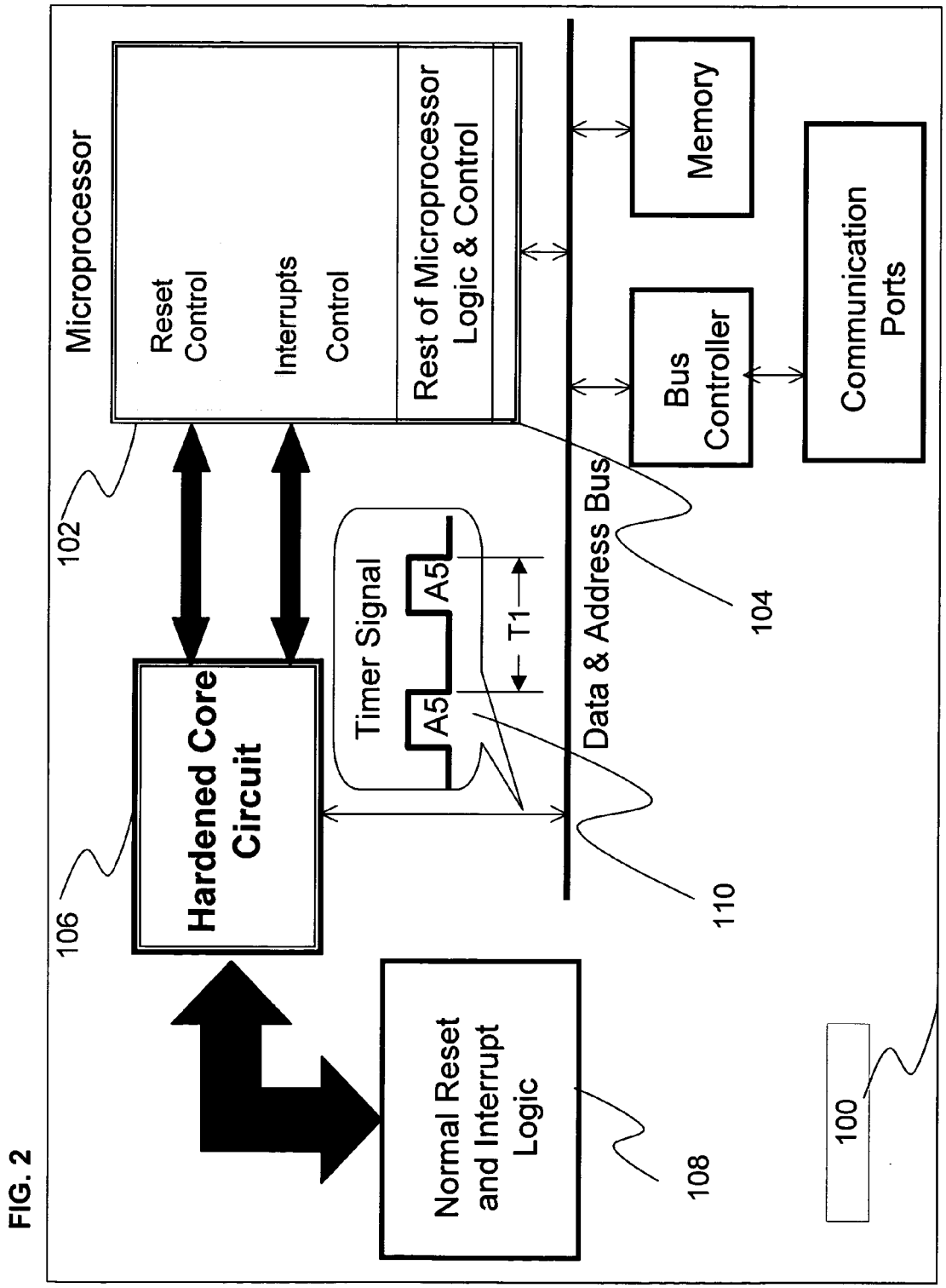
FIG. 2 shows an operational schematic of a Hardened Core hardware system architecture using a Hardened Core circuit with a microprocessor.

FIG. 2 illustrates an operational schematic of an embodiment of the Hardened Core hardware system 100. As shown, the interrupt and reset control signals 102 of the microprocessor 104 are electrically connected to the Hardened Core circuit 106 and the Normal Reset and Interrupt Logic 108, which generate normal interrupt and reset control signals, is electrically connected to the Hardened Core circuit 106. A Timer Signal 110 using any known code, such as 10100101 binary (A5 hexidecimal), is generated by microprocessor 104 software routines on a preset periodic basis T1 and is routed by the microprocessor 104 to the Hardened Core circuit 106.

Figure 3:
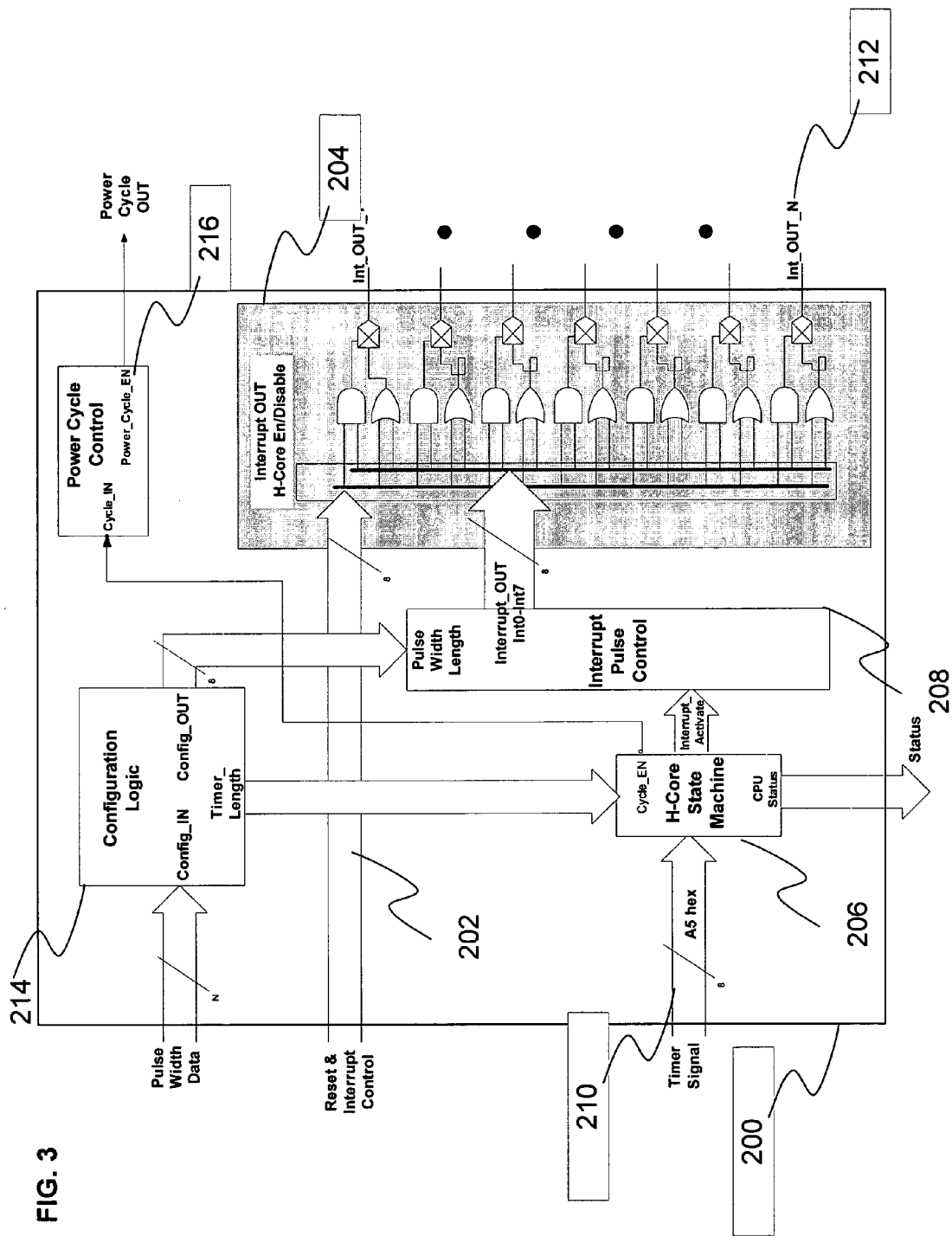
FIG. 3 shows an operational schematic of a Hardened Core circuit.

FIG. 3 illustrates an operational schematic of an embodiment of the Hardened Core circuit 200 in detail. The Hardened Core circuit 200 will be designed and manufactured in a manner that provides for tolerance against the environmental sources (radiation hardened, electromagnetic interference, electrical noise, etc.) of the functional interrupts and/or internal data errors. The interrupt and reset control signals 202 enter the Hardened Core circuit 200 and are connected to the input of the Interrupt Out H-Core Enable/Disable unit 204. The function of the Interrupt Out H-Core Enable/Disable unit 204 is to allow either the Normal Interrupt and Reset Logic 108 or H-Core State Machine 206 with Interrupt Pulse Control 208 length activate the microprocessor's 104 Interrupt and Reset Logic 102. When the microprocessor 104 is functionally interrupted (or hangs), it will not operate and will result in the Timer Signal 210 to be sent on its pre-selected time period (or at all), the H-Core State Machine 206 will determine it did not receive the Timer Signal 210 and the H-Core State Machine 206 with Interrupt Pulse Control 208 length will activate the microprocessor's 104 Interrupt and Reset Logic 102, causing the microprocessor 104 to return from its functionally interrupted state. The H-Core State Machine 206 may also be designed activate each Interrupt Output signal(s) 212 in any sequence or combination, allowing for maximum potential of providing fault correction to the microprocessor 104; and additionally may provide output status signals indicating whether a fault has occurred, which may be read by the microprocessor 104 after successful return from interrupt or reset. Internal to the Interrupt Out H-Core Enable/Disable unit 204 is a multiplexing function allowing either source to activate the unit, which then provides the appropriate Interrupt Output signal(s) 212 to the microprocessor 104. The Timer Signal 210 period and Interrupt Pulse Control 208 pulse width(s) may be controlled by the Configuration Logic 214 unit, which can be designed to create programmable analog or digital timing durations using industry standard circuit techniques (resistors/capacitors on analog timing circuits, programmable read-only memory for digital, etc.). As an optional fault correction function, the H-Core State Machine 206 may also generate an activation signal to the Power Cycle Control unit 216, which drives a power switch connected to the microprocessor's 104 power supply lines and provides for removal and return of its power supplies.

In alternate embodiments, the Hardened Core circuit 200 may include an application specific integrated circuit (ASIC) or other electronic circuit implementation.

Figure 4:
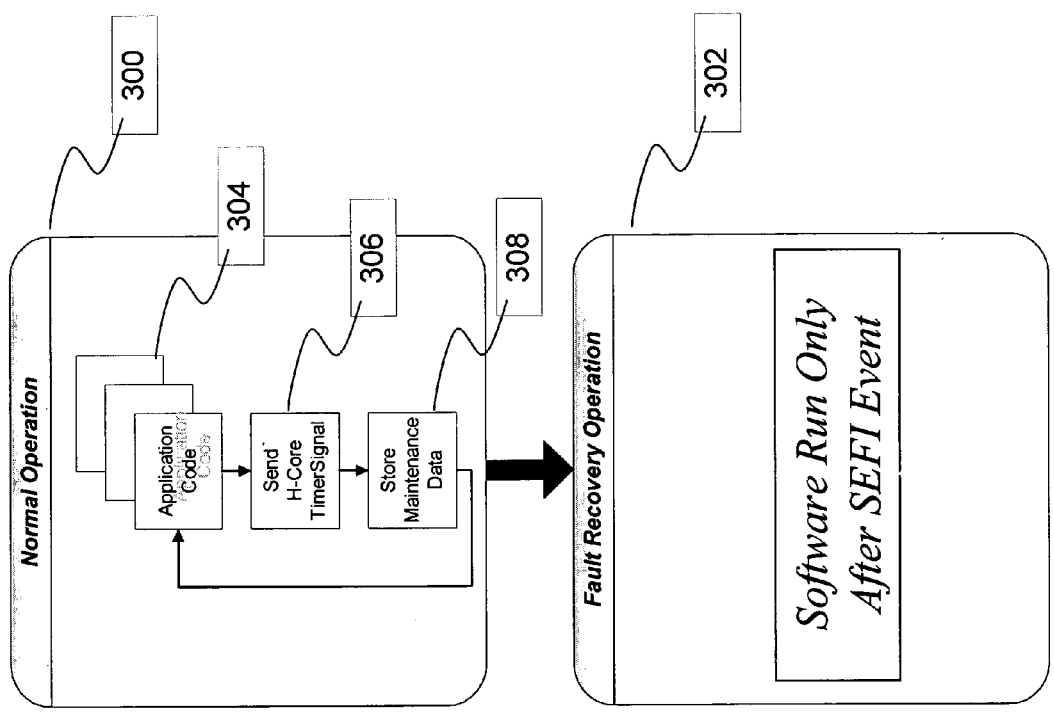
FIG. 4 shows an operational flowchart of a Hardened Core software maintenance routine.

FIG. 4 illustrates an operational flowchart of an embodiment of a Hardened Core software maintenance routine. As shown, software operation is split between two major elements: software for normal operation 300 and fault recovery 302. Normal operation 300 software contains both application code 304 (software that operates the computer for its "normal" function) and maintenance routines 306, 308. Maintenance software routines include the software necessary to send the Hardened Core Timer Signal 306 to the microprocessor 104 on a pre-selected time period and software routines that send application data, selected by each application, as maintenance data 308, such as stored instructions & data, to memory for future use by the recovery software 302. The fault recovery software 302 is located at the interrupt or reset vector address locations and is activated upon receipt of a hardware interrupt or reset, as shown in FIG. 2 and FIG. 3.

Figure 5:
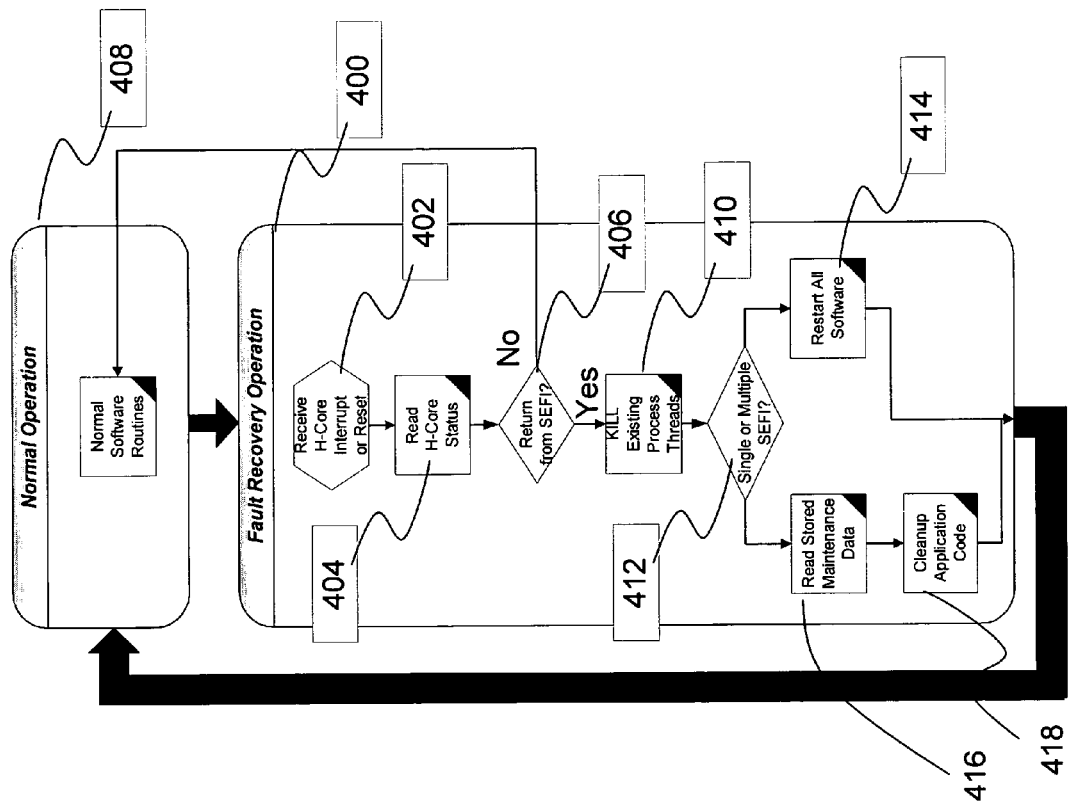
FIG. 5 shows an operational flowchart of a Hardened Core software repair routine.

FIG. 5 illustrates an operational flowchart of an embodiment of a Hardened Core software repair routine. As shown, software operation of the repair routines occurs within the fault recovery software 400. Upon receipt of a H-Core Interrupt or Reset 402 signal, the microprocessor 104 will begin to execute software at its appropriate interrupt/reset vector address location. The microprocessor 104 will Read the Status 404 output from the H-Core State Machine 206 section of the Hardened Core circuit 200 using the Return from SEFI (functional interrupt) routine 406 and will determine if the interrupt or reset signal is the result of normal operation (for example: an external reset or interrupt from a peripheral) or a functional interrupt. In the case of normal operation, the "No" case, the software will return to normal operation 408 software routines. In the case of determination of a functional interrupt, the "Yes" case, the software will continue. The next routine is the KILL Existing Process Threads 410, consisting of software that halts and ends (KILL) all existing software on the microprocessor 104 in order to prevent continuation or return of the software fault. Using the data loaded from the Read the Status 404 output, the software then determines if this is a Single or Multiple SEFI (fault) 412 and branches based upon application dependent requirements (such as number of functional interrupts within a predetermined time period, or similar criteria) to Restart All Software 414 routine or Read Stored Maintenance Data 416. The case of Restart All Software 414 routine ends all attempts to continue with any Normal Operation software 408 and restarts all software routines without an attempt to save any existing data. The case of Read Stored Maintenance Data 416 routine provides the ability to read the data previously stored during the Normal Operation 300, 408 during the Store Maintenance 308 software routine, allowing the microprocessor application to recover data or instruction locations lost during the functional interrupt. Additionally, the Read Stored Maintenance Data 416 can be utilized for restarting existing Normal Operation 300, 408 application software code 304. Further software may be added providing the ability to Cleanup Application Code 418 by operating software routines that verify each application thread is in its proper state (example: no missing interim data values) or may need to be restarted due to application requirements. A variety of similar software routines, added or re-arranged in different sequences are possible, those skilled in the art will appreciate that the Hardened Core repair software is comprised of identifying occurrence of a functional interrupt 406, stopping all existing software threads 410, recovering maintenance data from memory 416 and restarting the application software routines 414 then 408, with many similar variations possible.

Another embodiment is the combination of a Time-Triple Modular Redundancy (TTMR) system (disclosed herein), providing single bit error detection and correction in the microprocessor, with a Hardened Core system providing functional interrupt fault recovery. The TTMR system is capable of being implemented in very long instruction word (VLIW) microprocessors. In one embodiment, the VLIW microprocessor includes specialized software routines known as "ultra long instruction word" and/or "software controlled instruction level parallelism." These software routines include parallel functional units configured to execute instructions simultaneously wherein the instruction scheduling decisions are moved to the software compiler. The TTMR systems combines time redundant and spatially redundant (including TMR and/or Master/Shadow architectures) instruction routines together on a single VLIW microprocessor.

Figure 6:
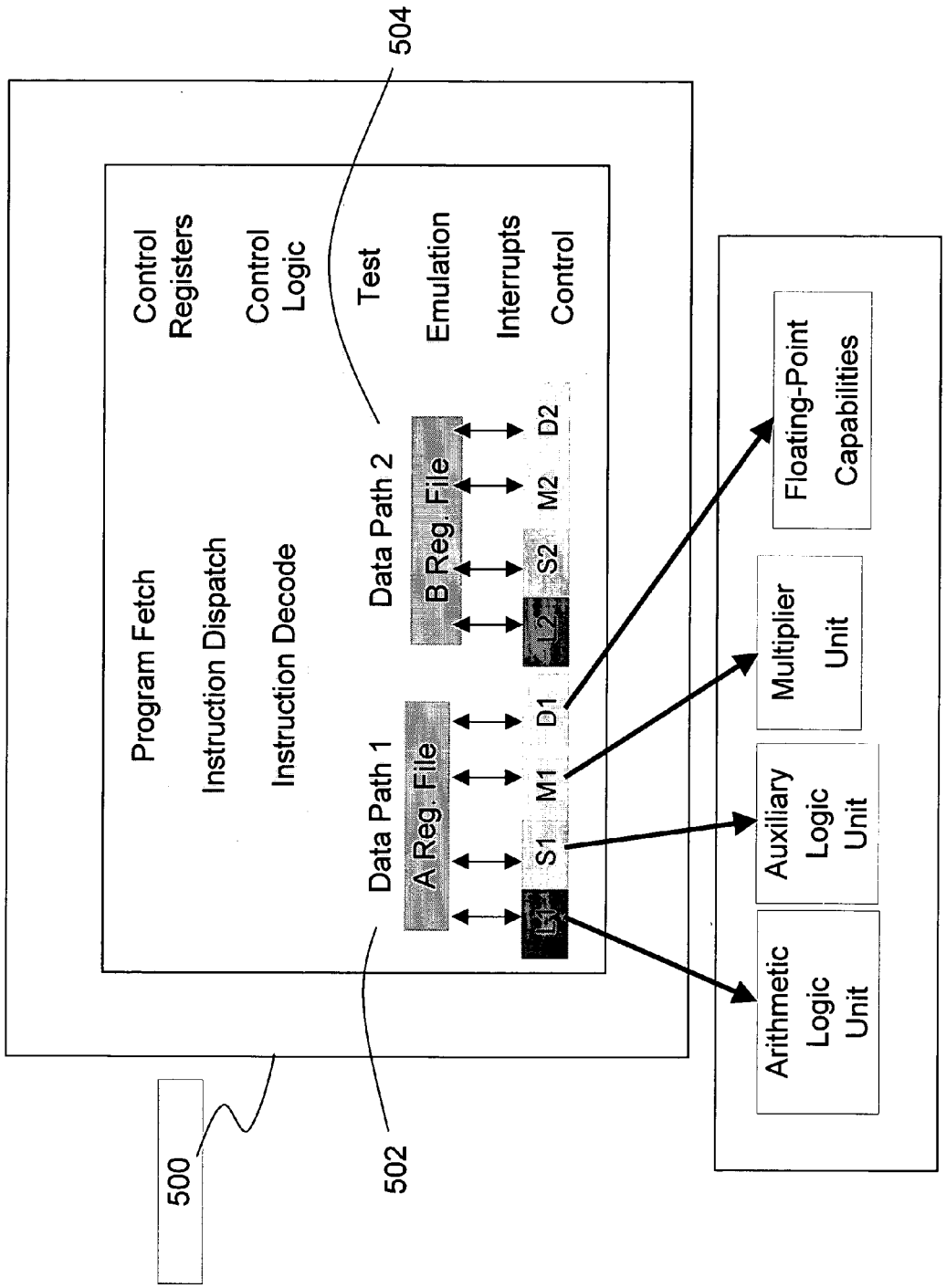
FIG. 6 shows an operational schematic of a very long instruction word (VLIW) microprocessor.

FIG. 6 shows a typical VLIW microprocessor. As shown, the VLIW microprocessor 500 includes a first data path 502 and at least a second data path 504. The first and second data paths 502, 504, respectively, may operate in parallel. Optionally, the first and second data paths 502, 504, respectively, may operate in series. As shown, the first data path 502 includes or is otherwise in communication with a first arithmetic logic unit L1, a first auxiliary logic unit S1, a first multiplier unit M1, and first floating-point capabilities D1. Similarly, the second data path 504 includes or is otherwise in communication with a second arithmetic logic unit L2, a second auxiliary logic unit S2, a second multiplier unit M2, and second floating-point capabilities D2. Exemplary VLIW microprocessors include, for example, the 320C6201 manufactured by the Texas Instrument's Corporation, although those skilled in the art will appreciate that the TTMR system disclosed herein is configured to operate with a variety of different VLIW microprocessors having varying architectures.

Figure 7:
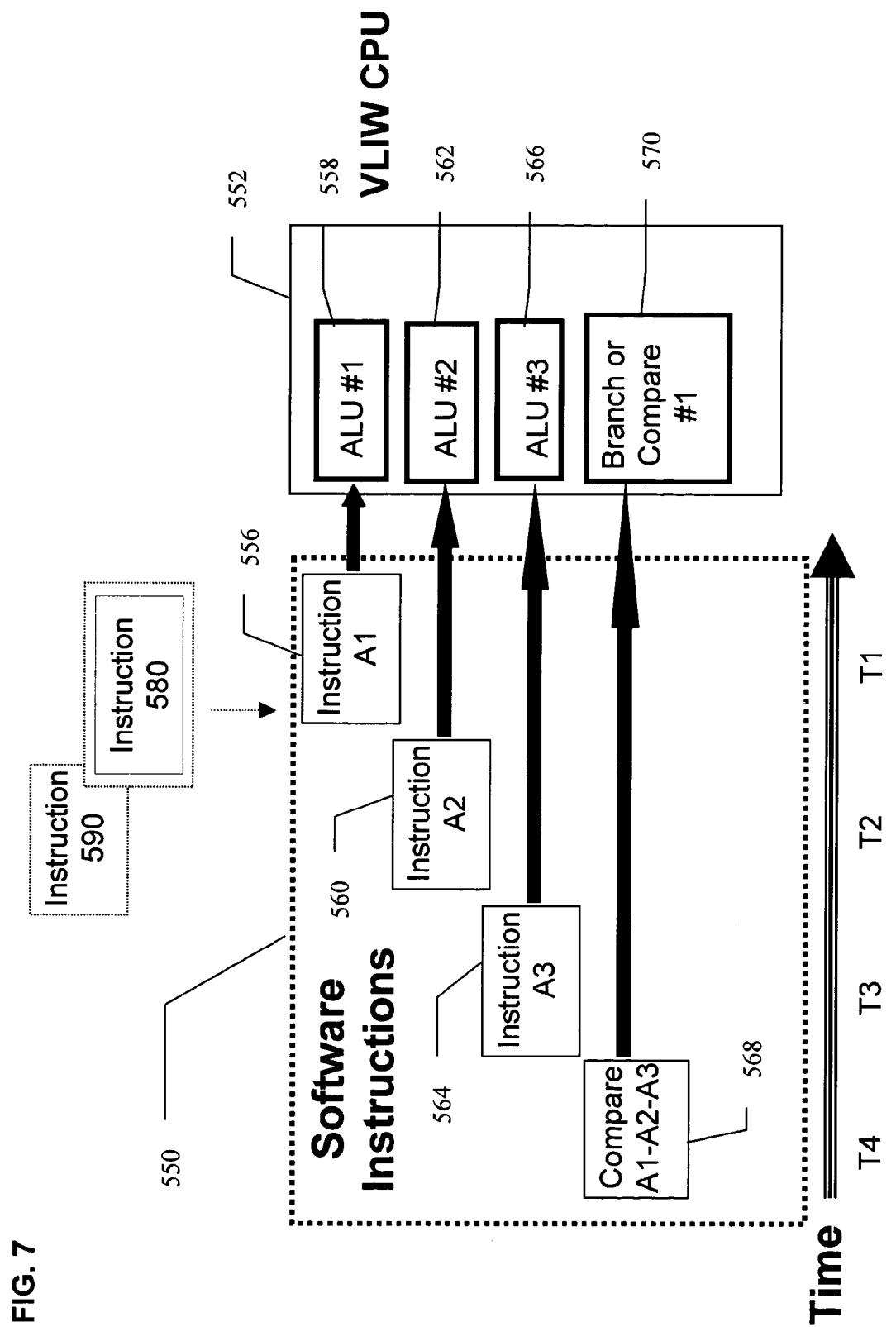
FIG. 7 shows an operational schematic of an embodiment of a TTMR redundant architecture.

FIG. 7 illustrates an operational flowchart of an embodiment of the TTMR software routine. As shown, an instruction may be repeated any number of times across different internal parallel cores in a triple modular redundant (TMR) fashion to provide a basis of comparing one instruction to at least another instruction. However, each repeated instruction is completed during a later clock cycle(s), thereby providing temporal and spatial redundancy. As illustrated, at clock cycle or time T1 a first instruction 556 is sent from a software controller unit 550 to a first arithmetic logic unit 558 within or in communication with a CPU 552. Thereafter, the first instruction is retained by a first memory device in communication therewith. At some later clock cycle or time interval T2, at least a second instruction 560 is sent from a software controller unit 550 to a second arithmetic logic unit 562 within or in communication with a CPU 552 and retained in a second memory device in communication therewith. In the illustrated embodiment, at some later clock cycle or time interval T3, a third instruction 564 is sent from a software controller unit 550 to a third arithmetic logic unit 566 within or in communication with a CPU 552 and retained in a third memory device in communication therewith. The instructions 556, 560, 564, respectively, are identical instructions sent at different time intervals, T1, T2, T3, respectively. Those skilled in the art will appreciate any number greater than 1 of instructions may be sent from the software controller unit 550 to the CPU 552 thereby permitting a comparison of instructions to occur within the CPU 552.

Referring again to FIG. 7, at a later clock cycle or time interval T4 a compare instruction 568 is then sent from the software controller unit 550 to the branch or compare unit 570 within or in communication with the CPU 552. Exemplary branch or compare units 570 may include, without limitation, at least one comparator in communication with the CPU 552. The branch or compare unit 570 accesses and compares the three instructions retained within the individual memory device in communication with the arithmetic logic units 558, 562, 566, respectively. If all three instructions stored within the individual memory device in communication the arithmetic logic units 558, 562, 566 match no error has occurred and the instruction is accepted and performed. If a discrepancy is detected between the instructions 556, 560, 564, respectively, stored within the individual memory device in communication with the arithmetic logic units 558, 562, 566, the arithmetic logic units 558, 562, 566 are polled to determine which two instructions match. Like TMR and time redundancy systems, in the present system the two matching instructions are assumed to be. Additionally, the TTMR system disclosed herein permits a second instruction 580 and a third instruction 590 to be completed in parallel with the first instruction 556 when three or more parallel functional units are available.

Figure 8:
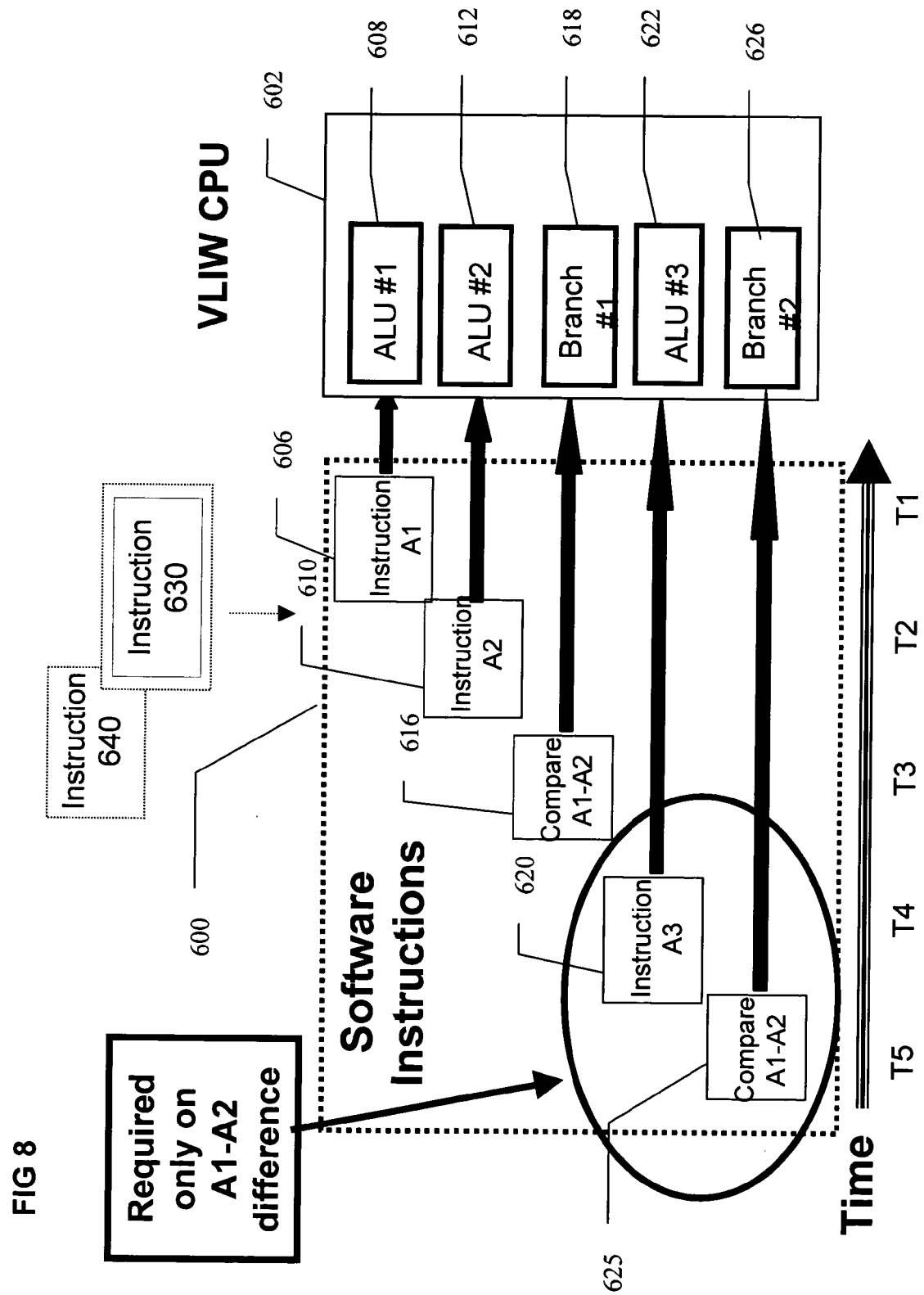
FIG. 8 shows an operational schematic of an embodiment of a TTMR redundant architecture using a Master/Shadow architecture.

FIG. 8 shows an alternate embodiment of a TTMR system using a spatial technique similar to the Master/Shadow method in combination with a time redundancy architecture. In the illustrated embodiment, a TTMR sequence for an instruction is repeated twice across different internal parallel cores, such as arithmetic logic units, in a Master/Shadow fashion. However, each repeated instruction is completed during a later clock cycle or time interval, similar to a time redundancy architecture. As illustrated, at clock cycle or time T1 a first instruction 606 is sent from a software controller unit 600 to a first arithmetic logic unit 608 within or in communication with a CPU 602. Thereafter, the first instruction is retained within a first memory device in communication therewith. At some later clock cycle or time interval T2, at least a second instruction 610 is sent from a software controller unit 600 to a second arithmetic logic unit 612 within or in communication with a CPU 602 and retained a second memory device in communication therewith.

At a later clock cycle or time interval T3, a compare instruction 616 is then sent from the software controller unit 600 to the branch or compare unit 618 within or in communication with the CPU 602. Exemplary branch or compare units 620 may include, without limitation, at least one comparator in communication with the CPU 602. The branch or compare unit 620 accesses and compares the two instructions retained within the memory devices in communication with arithmetic logic units 608, 612, respectively. If the two instructions stored within the memory devices in communication with the arithmetic logic units 608, 612 match no error has occurred and the instruction is accepted and performed. If a discrepancy is detected between the instructions 606, 610, respectively, stored within the memory devices in communication with the arithmetic logic units 608, 612, a third instruction 620 is sent from a software controller unit 600 to a third arithmetic logic unit 622 within or in communication with a CPU 602 and retained within a third memory device in communication therewith. The third instruction 620 is sent from the software controller unit 600 to the third arithmetic logic unit 622 at a later clock cycle or time interval T4 as compared with time interval T3. The instructions 606, 610, 620, respectively, are identical instructions sent at different time intervals, T1, T2, T4, respectively. Those skilled in the art will appreciate any number greater than 1 of instructions may be sent from the software controller unit 600 to the CPU 602 thereby permitting a comparison of instructions to occur within the CPU 602. The instructions stored within the memory devices in communication with the respective arithmetic logic units 608, 612, 622 are compared and any match therein is assumed to be a correct instruction. thereafter, the instruction may be performed. Like the previous embodiment, the TTMR system disclosed herein permits a second instruction 630 and a third instruction 640 to be completed in parallel with the first instruction 606 when three or more parallel functional units are available.

Figure 9:
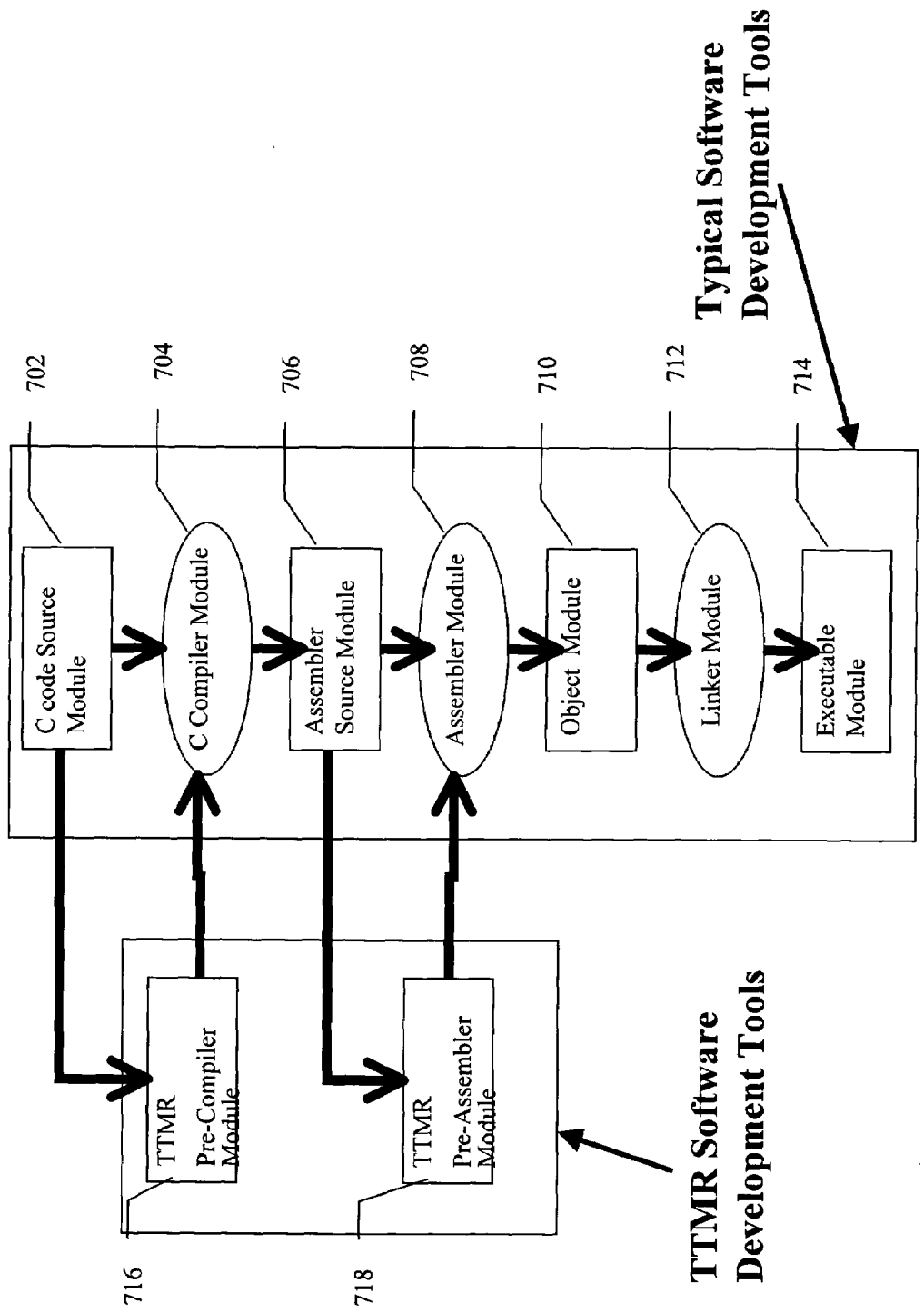
FIG. 9 shows an embodiment of a development flowchart used for developing TTMR software.

Implementation and control of the TTMR system takes place through software control of the VLIW microprocessor. TTMR software code can be developed using a variety of methods, which are dependent upon the individual microprocessor development environment and operating system(s). As shown in FIG. 9, TTMR software may be developed in high level programming languages (examples: Fortran, C, C++, Basic, etc.) or at the microprocessor assembly language (also known as machine code). As shown, the source module 702 may simultaneously sent to the compiler module 704 and the TTMR compiler module 716. The TTMR pre-compiler module 716 amends the data received from the source module to include the TTMR instruction set and sends the modified data module to the compiler module 704. The compiler module 704 compiles both the source data and the modified source data producing an assembler source module 706 and a TTMR pre-assembler module 718. The assembler source module 706 is sent to the assembler module 708. The TTMR pre-assembler module 718 scheduled and insert a TTMR format into the data received from the assembler source module 706 and forward the modified data to the assembler module 708. Thereafter, the assembler module 708 produces an object data module 710 which may be forwarded to a linker module 712. The linker module outputs an exectuable file module 714. To facilitate and simplify programming for users, automated development and management of TTMR instruction sets and cycles may be accomplished by the addition of a "Pre-Compiler" or "Pre-Assembler", where the original (no TTMR) software code is automatically duplicated and scheduled in a TTMR format, (for a C code language system as an example).

In the combined embodiment, the TTMR system may include or otherwise incorporate a Hardened Core system, where the microprocessor 104 of FIG. 2 is a VLIW microprocessor and the Reset and Interrupt Controls 102, plus Timer Signal 110 are connected as previously described herein.

What is claimed is:

1. A computer system with improved tolerance to microprocessor functional interrupts induced by environmental sources, comprising: a microprocessor not required to be radiation hardened; an array of memory, volatile or non-volatile, connected to said microprocessor; a hardened core circuit, designed to withstand environmentally induced faults, and connected to said microprocessor, in a manner allowing for said microprocessor's interrupt control, reset control, data bus, and address bus signals to connect to said hardened core circuit, and for said hardened core's status, interrupt output and power cycle output signals to connect to said microprocessor; a microprocessor software routine configured to send a predetermined timer signal from the microprocessor to the said hardened core circuit on a predetermined time period; a hardened core circuit function configured to read the predetermined timer signal from said microprocessor on the predetermined time period and activate said microprocessor's interrupt and reset control input signals if timer signal is not received within the predetermined time period to provide for removal of said microprocessor from functionally interrupted state; a microprocessor software routine located at said microprocessor's interrupt or reset vector addresses, configured to restart the microprocessor's application software.

2. A system of claim 1 further comprising a microprocessor software routine configured to send maintenance data to the microprocessor memory prior to functional interrupt and configured to read said maintenance data from the microprocessor memory after microprocessor's removal from functionally interrupted state and use maintenance data to restart microprocessor's application software routines.

3. The system of claim 2 further comprising a microprocessor software routine configured to read said hardened core status signal(s), and to determine if interrupt or reset activation was a result of hardened core activation and then restart application software routines, or normal interrupt or reset and then continue with normal application software operation.

4. The system of claim 3 further comprising a microprocessor software routine configured to halt all currently operating application software threads.

5. The system of claim 4 further comprising a microprocessor software routine configured to read hardened core status signal(s), and to determine if multiple functional interrupts occurred within the predetermined time period and then to restart all microprocessor software and hardware if multiple functional interrupts occurred within the predetermined time period, or, if single functional interrupt occurred in the predetermined time period then to read maintenance data stored in said memory and provide a controlled restart of selected application software.

6. A computer system with improved fault tolerance from microprocessor, data errors and functional interrupts, comprising: a microprocessor not required to be radiation hardened; an array of memory, volatile or non-volatile, connected to said microprocessor; a fault tolerant software routine configured to send a first instruction and at least a second instruction to the microprocessor, the first and at least the second instructions being identical and being inserted into spatially separated functional computational units of the microprocessor at different clock cycles; a first and at least a second memory device in communication with the microprocessor, the first memory device configured to store the first instruction, the second memory device configured to store at least the second instruction; a software instruction to compare the first instruction to at least the second instruction; a comparator to compare the first instruction to the second instruction; a hardened core circuit, designed to withstand environmentally induced faults, and connected to said microprocessor, in a manner allowing for said microprocessor's interrupt control, reset control, data bus, and address bus signals to connect to said hardened core circuit, and for said hardened core's status, interrupt output and power cycle output signals to connect to said microprocessor; a microprocessor software routine configured to send a predetermined timer signal from the microprocessor to the said hardened core circuit on a predetermined time period; a hardened core circuit function configured to read the predetermined timer signal from said microprocessor in the predetermined time period and activate said microprocessor's interrupt and reset control input signals if the timer signal is not received within the predetermined time period to provide for removal of said microprocessor from a functionally interrupted state; and a microprocessor software routine located at said microprocessor's interrupt or reset vector addresses, configured to restart the microprocessor's application software.

7. The system of claim 6 further comprising a third instruction sent by the fault tolerant software routine to the microprocessor, the third instruction stored in a third memory device in communication with the microprocessor.

8. The system of claim 7 wherein the software instruction directs the comparator to compare the first, second, and third instruction.

9. The system of claim 8 wherein a match of any of the first, second, and third instructions is accepted by the microprocessor.

10. The system of claim 6 wherein the microprocessor comprises a very long instruction word (VLIW) microprocessor.

11. A software and hardware computer system with improved fault tolerance from microprocessor data errors and functional interrupts, comprising: a very long instruction word (VLIW) microprocessor not required to be radiation hardened; an array of memory, volatile or non-volatile, connected to said microprocessor; a fault tolerant software routine comprising a first instruction and a second instruction, each inserted into two spatially separate functional computational units in the VLIW microprocessor at two different clock cycles and stored in a memory device in communication with the microprocessor, the first and second instructions being identical; a software instruction to compare the first and second instructions in the memory device in communication with a VLIW microprocessor compare or branch units, and configured to perform an action if the first and second instructions match, the fault tolerant software routine comprising a third instruction inserted into a third spatially separate functional computational unit in the VLIW microprocessor at a third different clock cycle and stored in a third memory device in communication with the microprocessor, the first, second, and third instructions being identical; the software instruction to compare the first, second, and third instructions in the memory devices in communication with a VLIW microprocessor compare or branch units, and configured to perform an action if any of the first, second and third instructions match; a hardened core circuit, designed to withstand environmentally induced faults, and connected to said microprocessor, in a manner allowing for said microprocessor's interrupt control, reset control, data bus, and address bus signals to connect to said hardened core circuit, and for said hardened core's status, interrupt output and power cycle output signals to connect to said microprocessor; a microprocessor software routine configured to send a predetermined timer signal from the microprocessor to the said hardened core circuit on a predetermined time period; a hardened core circuit function configured to read the predetermined timer signal from said microprocessor in the predetermined time period and activate said microprocessor's interrupt and reset control input signals if the timer signal is not received within the predetermined time period to provide for removal of said microprocessor from functionally interrupted state; and a microprocessor software routine located at said microprocessor's interrupt or reset vector addresses, configured to restart the microprocessor's application software.

* * * * *

UNITED STATES PATENT AND TRADEMARK OFFICE
CERTIFICATE OF CORRECTION

PATENT NO.         : 7,237,148 B2
APPLICATION NO.    : 10/656720
DATED              : June 26, 2007
INVENTOR(S)        : Czajkowski et al.

It is certified that error appears in the above-identified patent and that said Letters Patent is hereby corrected as shown below:

Claim 6, Column 9, Line 32,
Please delete "microprocessor, data errors"
and replace with -- microprocessor data errors --

Signed and Sealed this

Seventh Day of August, 2007

JON W. DUDAS
*Director of the United States Patent and Trademark Office*